United States Patent
Radant et al.

[11] Patent Number: 5,522,432
[45] Date of Patent: Jun. 4, 1996

[54] MAIN STEAM LINE PLUG AND LOCKING RING

[75] Inventors: Russell R. Radant, Central Village; Adrian P. Wivagg, Tolland, both of Conn.

[73] Assignee: Combustion Engineering, Inc., Windsor, Conn.

[21] Appl. No.: 34,775

[22] Filed: Mar. 19, 1993

[51] Int. Cl.$^6$ .................... F16L 55/10; F16L 55/18
[52] U.S. Cl. .................... 138/93; 138/89; 376/203
[58] Field of Search .................... 138/89, 93, 90; 376/203, 204

[56] References Cited

U.S. PATENT DOCUMENTS

| | | | |
|---|---|---|---|
| 3,593,749 | 7/1971 | Reardon | 138/93 |
| 3,884,261 | 5/1975 | Clynch | 138/93 |
| 4,470,946 | 9/1984 | Vassalotti | 376/204 |
| 4,518,015 | 5/1985 | Fischer | 138/93 |
| 4,584,162 | 4/1986 | Yoli | 376/204 |
| 4,591,477 | 5/1986 | Rettew | 376/204 |
| 4,637,588 | 1/1987 | Wilhelm et al. | 138/93 |
| 4,690,172 | 9/1987 | Everett | 376/204 |
| 4,769,207 | 9/1988 | Weber et al. | 138/89 |
| 4,827,984 | 5/1989 | Young et al. | 138/93 |
| 4,848,406 | 7/1989 | Stauner et al. | 138/93 |

*Primary Examiner*—James E. Bryant, III
*Attorney, Agent, or Firm*—Ronald P. Kananen; John H. Mulholland

[57] ABSTRACT

A plug which is inserted into the nozzle of nuclear reactor steam line is provided with a set of inflatable primary seals which resemble a pair of tires. A locking ring which features pads which can be hydraulically driven radially outward into engagement with the nozzle wall, is located adjacent the tire-like inflatable seals. The latter are inflated by a spring loaded piston. A tool which inserts the plug into the nozzle is adapted to tract the piston against the bias of the preloading springs, until such time as the plug is inserted into position. After insertion the piston is released and the seals are inflated.

5 Claims, 6 Drawing Sheets

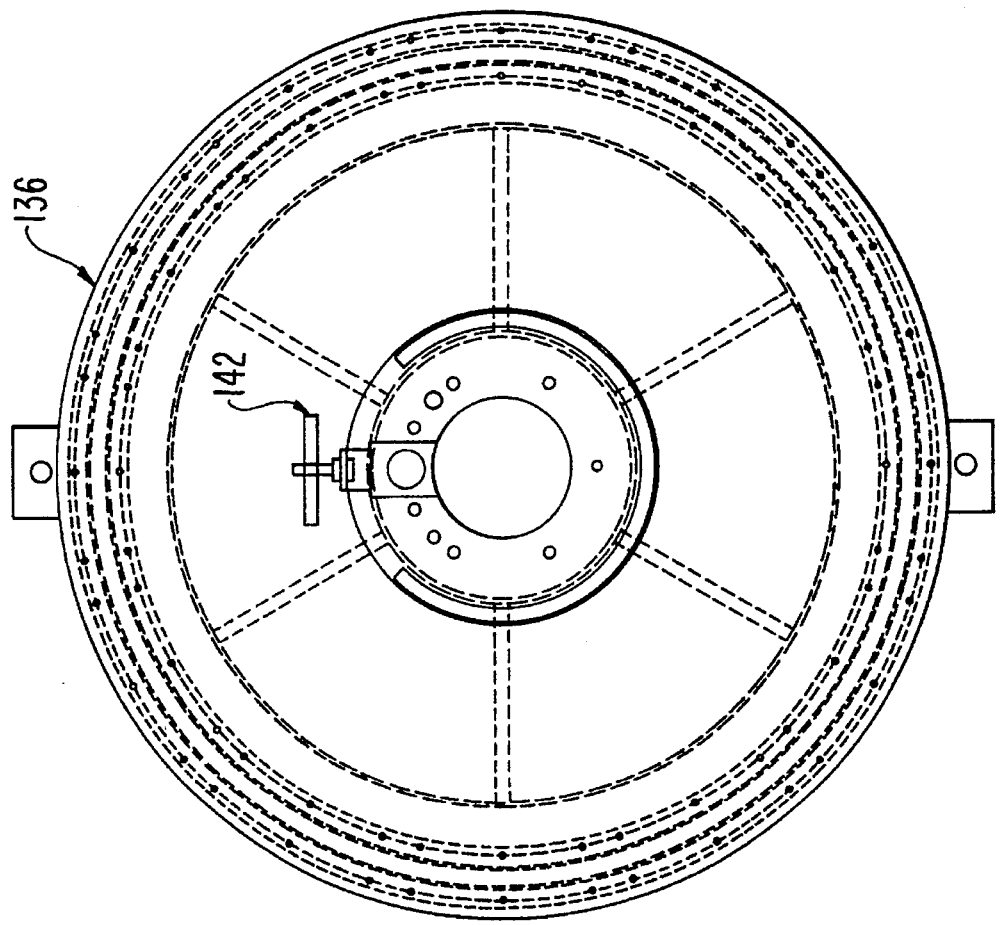
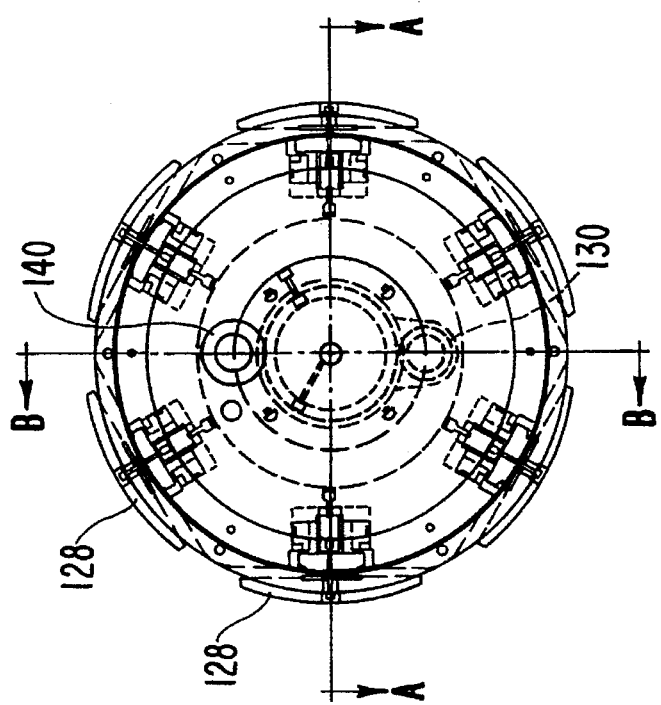

MAIN STEAM LINE PLUG AND LOCKING RING

BACKGROUND OF THE INVENTION

1. Field of the Invention

The present invention relates generally to a Main Steam Line Plug (MSLP) and more specifically to an improved Main Steam Line Plug (MSLP) which features a lock and seal arrangement which provides a seal which facilitates Local Leak Rate Tests (LLRT), and a positive locking engagement which prevents accidental ejection of the plug into the vessel.

2. Description of the Related Art

The purpose of the Main Steam Line Plug (MSLP) is to seal the main steam lines in reactors such as Boiling Water Reactors (BWR) during outages. The plug seals against the static water head present whenever the reactor cavity is flooded. In addition, the plug seals against pressure downstream in the line during Local Leak Rate Test (LLRT) while providing a positive locking force to prevent accidental ejection of the plug into the vessel.

There are three basic problem areas associated with the MSLP's currently in use. The first is the difficulty in activating the seals which prevent leakage from the static head. After initial installation, which is performed individually with each plug, the seals must be mechanically engaged. This, of course, is a labor intensive and time consuming process.

Secondly, some current plugs have no means via which they can be fixed in place in the steam lines. This induces the drawback that they are incapable of withstanding the LLRT back pressure, thereby necessitating that the LLRT is testing performed on the downstream side of the valve to be tested instead of the preferred upstream side.

Thirdly, the current plugs are often difficult to remove. This is due to the mechanical seals sticking fast in the steam lines and the inability of the steam line to be back filled prior to removal of the plug. To overcome this sticking problem it is not uncommon for the steam line to require pressurization in order that stubborn plugs be forced out.

SUMMARY OF THE INVENTION

It is an object of the present invention to provide a steam line plug arrangement which expedites the insertion and removal from steam line nozzles.

It is a further object of the present invention to provide a steam line plug design which can be adapted to fit any size steam line currently in use.

Another object of the invention is to provide a hydraulically operated locking ring arrangement which enables the plug to be selectively locked in position within a steam line.

It is a further object of the present invention to provide a steam line plug which includes an inflatable seal construction in addition to the locking ring.

It is a further object of the invention to install the steam line plug using a special tool which selectively retracts and releases a spring loaded piston or the like type of arrangement included in the plug and therefore enables selective inflation/deflation of the inflatable seals.

It is yet another object of the present invention to provide a remotely controlled tool which is designed to support a plurality of steam line plugs and enable the plugs to be simultaneously inserted into different steam line nozzles.

Basic features of the invention include the following:

Self Activating/Releasing Seals

The invention features use of two retention/sealing arrangements, wherein one is a pair of inflatable bladders, and the other is a static O-ring face seal. The inflatable seals are automatically inflated when the plug is installed and a special insertion tool releases a spring loaded hydraulic piston which is built into the plug. The pressure provided by the spring loaded piston provides the primary seal against the static head. The insertion tool also seats the static seal against the vessel wall, thereby completing the sealing process. When the plug is removed, the insertion tool retracts the piston and completely deflates the inflatable seals.

The preferred embodiment of the insertion tool is designed to install and remove two MSLP's simultaneously. During the installation and removal process, the insertion tool retracts and releases the piston shaft of the above mentioned spring loaded piston, thereby activating the inflatable seals. All operations of the insertion tool are performed remotely on the refuel floor at a control panel.

Locking Ring/Accumulator

The locking ring consists of a plurality of radially oriented hydraulic cylinders. All of these cylinders can be machined from a solid piece of plate stock. The cylinders, when pressurized (at several thousand psi, e.g., at 3,000 psi), press brake pad-like members out against the inside surface of the steam line nozzle, so that the members engage the wall of the line and create a frictional force which prevents the plug from being ejected from the steam line. The locking ring is fluidly communicated with a hydraulic accumulator which is built into the plug. This accumulator prevents sudden pressure loss and attenuates minor volume changes. Pressure is supplied to the accumulator by way of a single conduit or line which leads to a control panel located on the refuel floor. In the preferred embodiment, this is the only line required to operate the plug.

Inflatable Seals controllable to two pressure levels

The inflatable seals need to be inflated to a higher pressure than normal during the LLRT test. A pressure reducing cylinder arrangement is built into the plug which converts the locking ring hydraulic pressure to a lower value which is additionally supplied to the inflatable seals and thus further increases the pressure with which they are inflated. In this way, by energizing the locking ring, the inflatable seals are automatically pressurized to a higher level suitable for LLRT test. When the locking ring is depressurized, the inflatable seals return to their original pressurized condition.

Through Vent Line/LLRT Line

The preferred embodiment of the invention is preferably provided with two through lines. One is a 1½" line with a ball valve on one end. This ball valve can be opened from the surface and allows for rapid back filling of the steam line to ease removal of the plugs. The other is a ½" through line with a quick connect which allows the LLRT to be performed through the plug from the refuel floor. The ½" line also aids in back filling the steam line.

More specifically, a first aspect of the present invention resides in a system having a conduit which terminates in a nozzle, and a plug for insertion into the nozzle, the plug featuring: inflatable seal means for establishing a fluid tight seal between the inner periphery of the nozzle; seal inflation means for forcing a working fluid into the inflatable seals, the seal inflation means including a device which is adapted to be controlled by an insertion tool to assume a first condition wherein the inflatable seals are deflated until the plug is positioned in the nozzle, and assume a second condition wherein the inflatable seals are inflated after the plug is inserted; and hydraulically actuated locking means for establishing a friction engagement with the wall of the nozzle.

A second aspect of the present invention resides in that the above mentioned system further comprises a pressure control means which is responsive to the actuation of the locking means and which varies the pressure with which the inflatable seal is inflated.

Another aspect of the present invention resides in a system wherein the above mentioned insertion tool comprises: an elongate body; means for supporting a plug at each end of the body; and servo means disposed within the body for moving plugs supported at each end of the body into opposed nozzles or ports and for controlling the devices in the plugs at each end of the body to inflate the inflatable seals thereof after the plugs have been inserted into their respective nozzles.

A further aspect of the present invention resides in a plug for insertion into an end of a conduit comprising: a spring loaded piston means in the body for producing a first hydraulic pressure; inflatable seal means responsive to the first hydraulic pressure for sealingly engaging a wall of the conduit; and a clutching means, responsive to a source of a second hydraulic pressure, for establishing a frictional engagement with the wall of the conduit which retains the plug in the conduit.

Another aspect of the present invention resides in an insertion tool comprising: means for supporting a plug; means for retracting a spring loaded piston in the plug to a position wherein inflatable seal means on the plug is deflated; and means for inserting the plug into an orifice and for inducing the retracting means to release the spring loaded piston and inducing the inflatable seal means to assume an inflated state.

Yet another aspect of the invention resides in a system comprising a plug and an insertion tool, the insertion tool comprising: a body adapted to support the plug; means, included in the body, for conditioning a source of pressure in the plug to assume a first low level and thus inducing inflatable seal means on the plug to become deflated; and means for inserting the plug into a predetermined position and for inducing the source conditioning means to condition the source of pressure in the plug to assume a second high level and induce the inflatable seal means to become inflated.

BRIEF DESCRIPTION OF THE DRAWINGS

The present invention will become more clearly appreciated as a description of the preferred embodiments of the invention is made with reference to the appended drawings in which:

FIG. 5 is an end view as seen along arrow C of FIG. 4 showing the inboard end of the plug.

FIG. 6 is another end view as seen along arrows D—D of FIG. 4 showing the outboard end of the plug.

DESCRIPTION OF THE PREFERRED EMBODIMENTS

Figure 1:
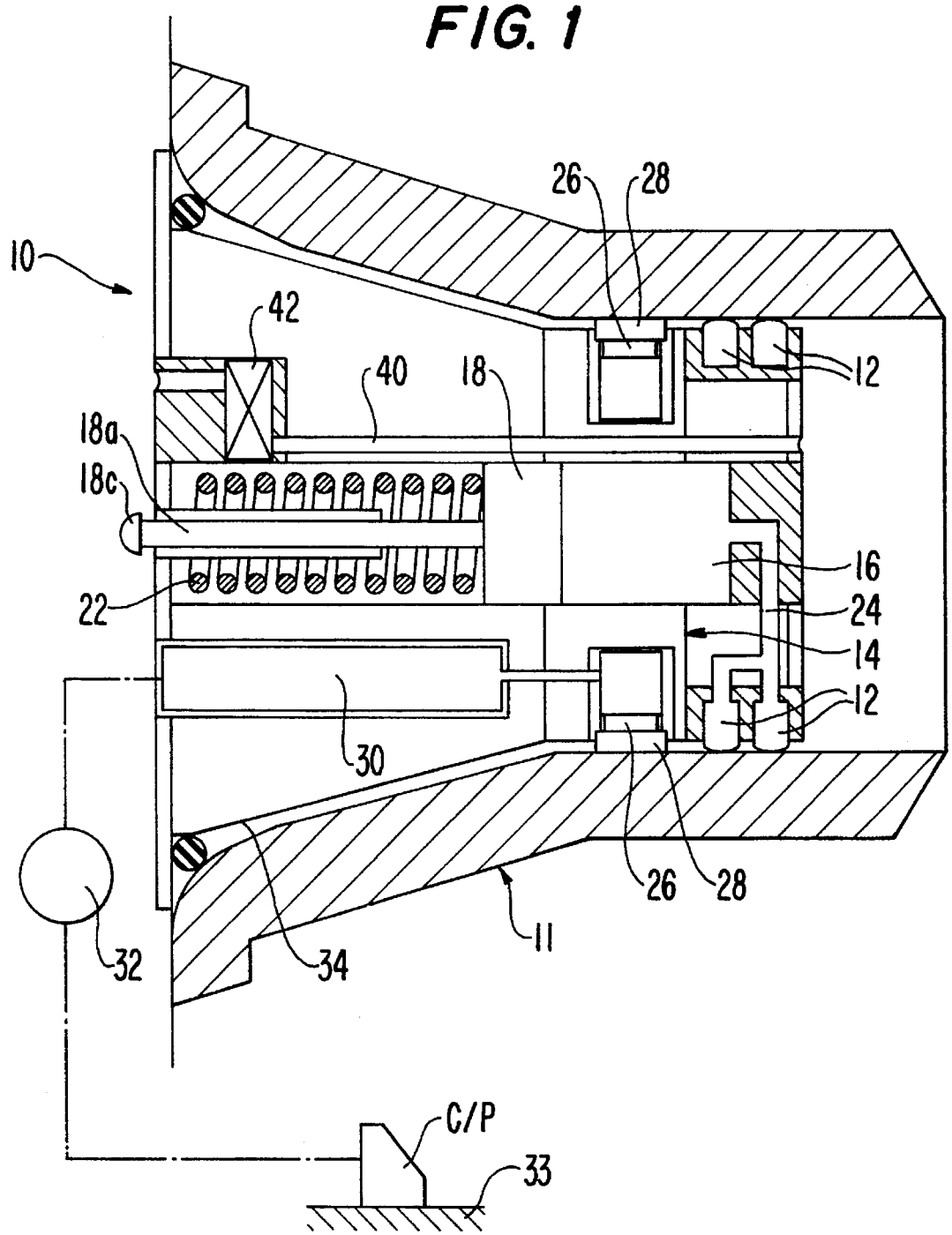
FIG. 1 is a schematic sectional elevation showing a plug according to the present invention disposed in a steam line nozzle.

FIG. 1 schematically depicts a plug 10 according the present invention, sealingly inserted into a steam line nozzle 11. In the illustrated arrangement, a pair of toroidal shaped inflatable (primary) seals 12 are disposed proximate the leading end of the plug 10. Located adjacent the primary seals is a locking ring 14. The primary seals 12 are illustrated as being fluidly communicated with a chamber 16 which is filled with demineralized water. A piston 18 is slidably received in a cylindrical structure 20 in which the chamber is formed. A spring 22 is disposed in the cylindrical structure and arranged to bias the piston 18 in a direction which displaces water out of the chamber through a supply conduit 24 to the interior of the primary seals 12.

It will be noted that the cylindrical structure 20 extends essentially coaxially through the middle of the plug body.

The piston 18 is provided with a piston rod 18a. The free end of this rod is provided with a suitable connector 18b which is adapted to be gripped by an arrangement included in a mounting tool and retracted against the bias of the spring 22 in a manner which reduces the pressure which is supplied to the interior of the primary seals.

The locking ring 14 comprises a plurality of radially oriented bores. Each of these bores receives a piston 26, the outboard end of which is provided with a pad 28 which is adapted to grip the inner periphery of the nozzle 11. The pistons 26 are received in the bores in a manner which respectively define variable volume working chambers. These chambers are illustrated as being fluidly communicated with an accumulator 30 which is disposed within the plug body and located adjacent the cylindrical structure. In accordance with the present invention, this accumulator 30 is filled with demineralized water and arranged to communicate with a controllable source of fluid under pressure (e.g. compressed nitrogen gas) 32 in a manner which enables the accumulator 30 to be charged to a predetermined high pressure. The pressure prevailing in the accumulator is monitored by sensor means included in a control panel C/P on a refuel floor 33. Feedback control of the pressure in the accumulator enables the desired pressure(s) to be established and controlled.

A cone assembly includes a relatively thin metal frusto conical member 34 which extends between and interconnects the locking ring 14 with a relatively robust base plate. An O-ring 38 is disposed on the inboard face of the base plate 36. This O-ring 38 is arranged to sealingly engage a mouth portion of the steam line nozzle 11 when the plug is fitted thereinto. This O-ring cooperates with the locking ring arrangement to provide the above-mentioned face seal.

A vent line 40 leads from the base plate 36 to the inboard end of the plug. A selectively operable valve 42 is disposed in this vent line 40. This valve 42 is normally maintained closed and is opened to enable rapid back filling of the steam line such as when is it desired to remove the plug.

It should be noted that the arrangement depicted in FIG. 1 is for illustrative and explanatory purposes and presented in a manner which is intended to allow the basic concepts of the invention to be readily grasped. This arrangement is not necessary indicative of designs and arrangements which would be actually implemented. By way of example, this arrangement does not feature the second through line which is preferably included in the preferred embodiment (constructional details of which are given in FIGS. 2 through 9) and does not show the stepped piston arrangement (shown in FIGS. 2 and 4) which allows the pressure in the inflatable primary seals to be varied in accordance with the pressurization and engagement of the locking ring.

FIGS. 2 to 8 show details which characterize the construction of a preferred embodiment of the present invention. Conceptually this embodiment is arranged in essentially the same manner as a FIG. 1 depiction.

Figure 2:
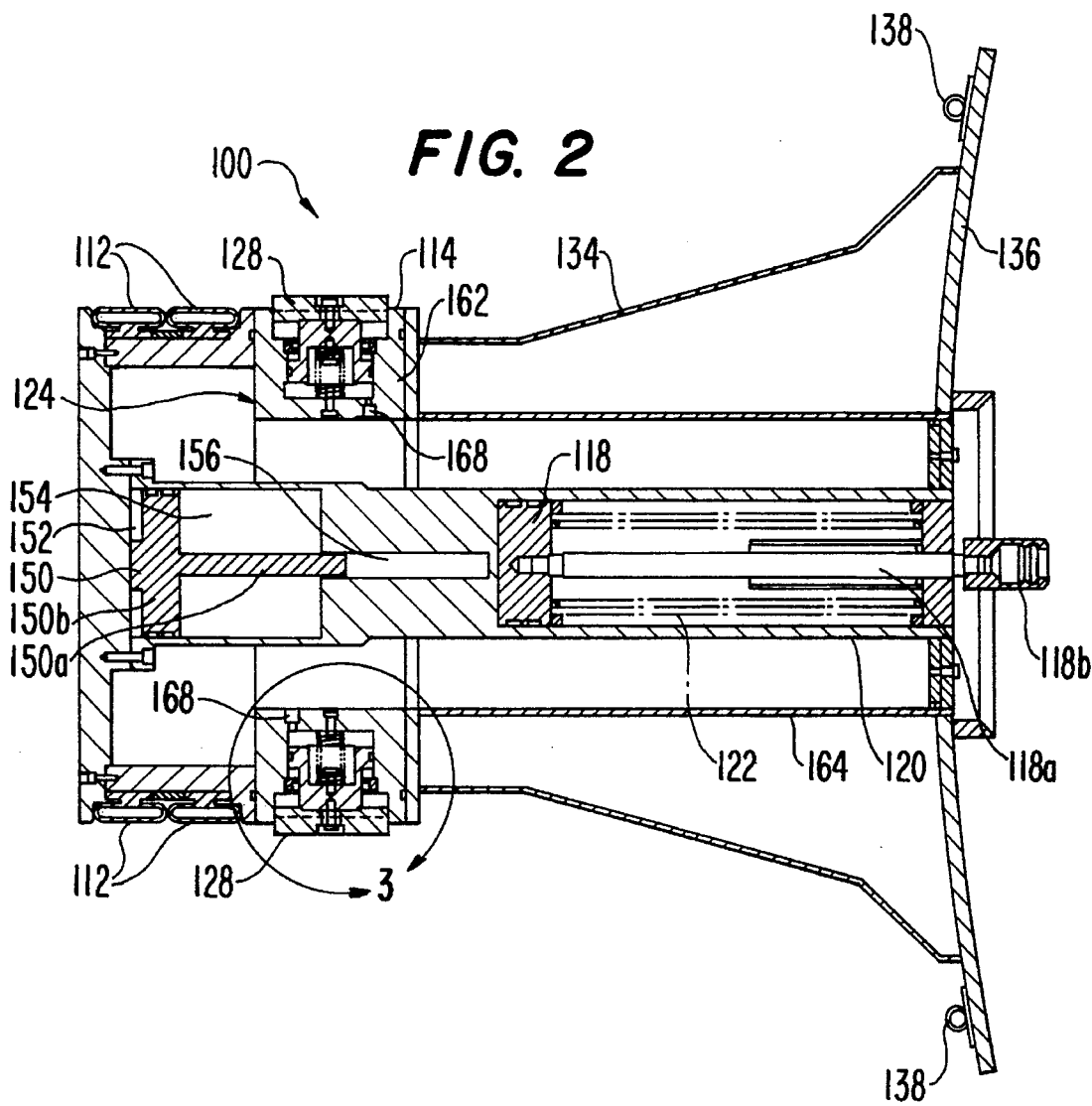
FIG. 2 is a sectional plan view taken along section line A—A of FIG. 5 showing constructional details of a preferred embodiment of the present invention.
Figure 4:
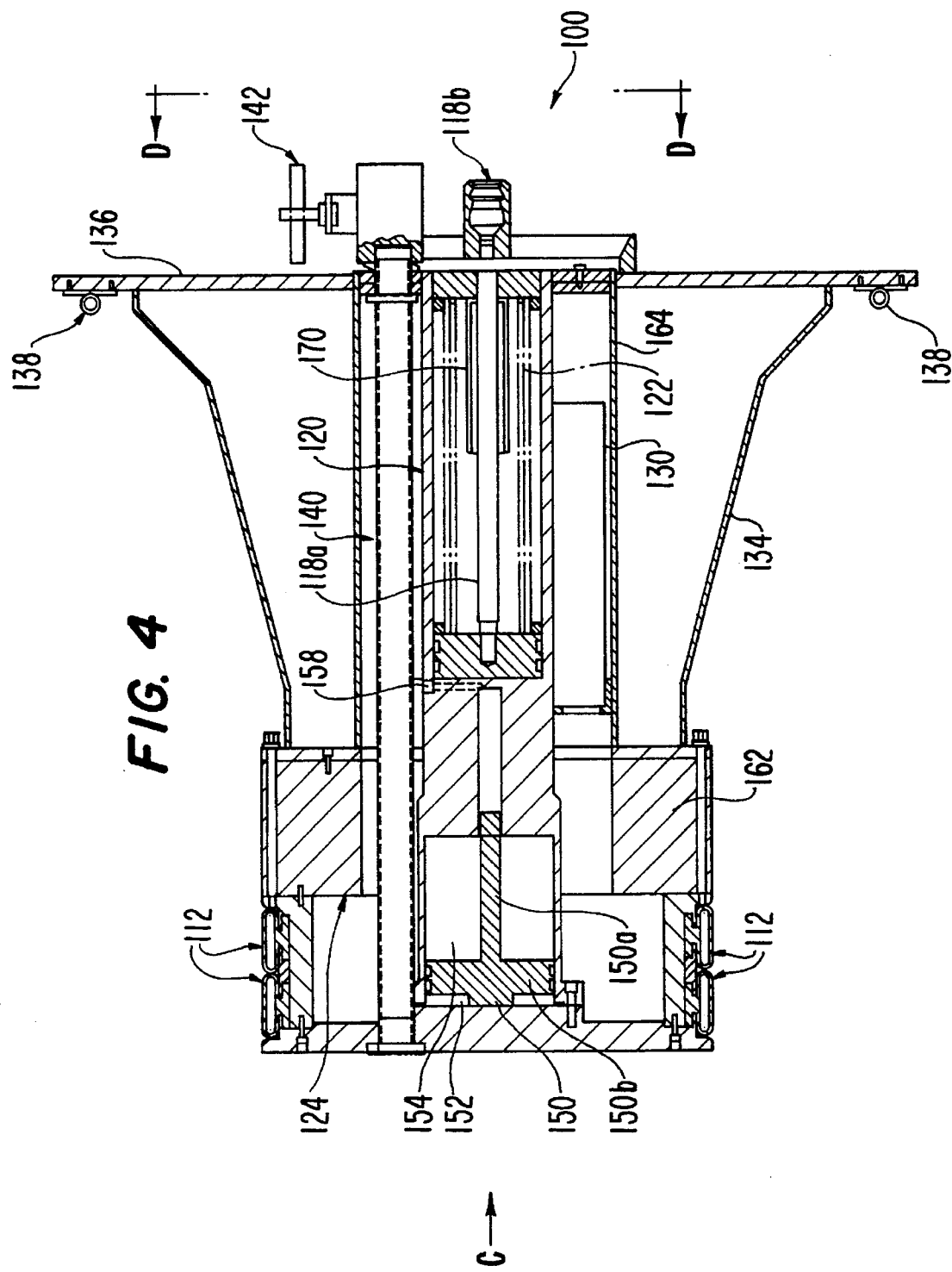
FIG. 4 is a sectional elevation as taken along section line B—B of FIG. 5.

It will be noted that the base plate 136 is shown as being curved in FIG. 2, while being flat in FIG. 4. The reason for this is that as the steam line ports are spacedly arranged about a vertical wall portion of circular opening formed in the reactor vessel, they have a curved plan configuration (viz., exhibit curvature when observed from above). Accordingly, the base plate is machined to assume a configuration which is curved in one plane and which allows it to seat snugly against the mouth of the steam line nozzle.

The cylindrical structure 120 in this embodiment is formed with a partition portion 120a. This partition portion 120a is formed with an elongate blind bore 120b which receives the rod 150a of a stepped "floating" piston 150. As will be appreciated from the drawings, the larger diameter portion 150b of the stepped piston partitions a space which is defined within the inboard end portion of the cylindrical structure 120, into two chambers 152, 154. The "upper" chamber 152 is fluidly communicated with the two toroidally shaped inflatable seals or "tires" as they will be referred to hereinafter, by way of conduiting (not shown) in this figure. The "lower" chamber 154 is fluidly communicated with the chamber which is defined in the cylindrical structure by the spring loaded piston 118 (note all of the water is shown displaced from this chamber into the lower chamber 154) by way of a non-illustrated passage structure. The stepped piston 150 is accordingly displaced to a position wherein the water, which is contained in the upper chamber 152, is forced into the tires 112 thus inducing inflation of the latter.

The chamber 156 which is defined in the elongate blind bore 120b by the rod 150a is fluidly communicated with the exterior of the cylindrical structure 120 by way of a radial bore 158 (see FIG. 4). The reason for this arrangement will become more apparent hereinlater.

Figure 7:
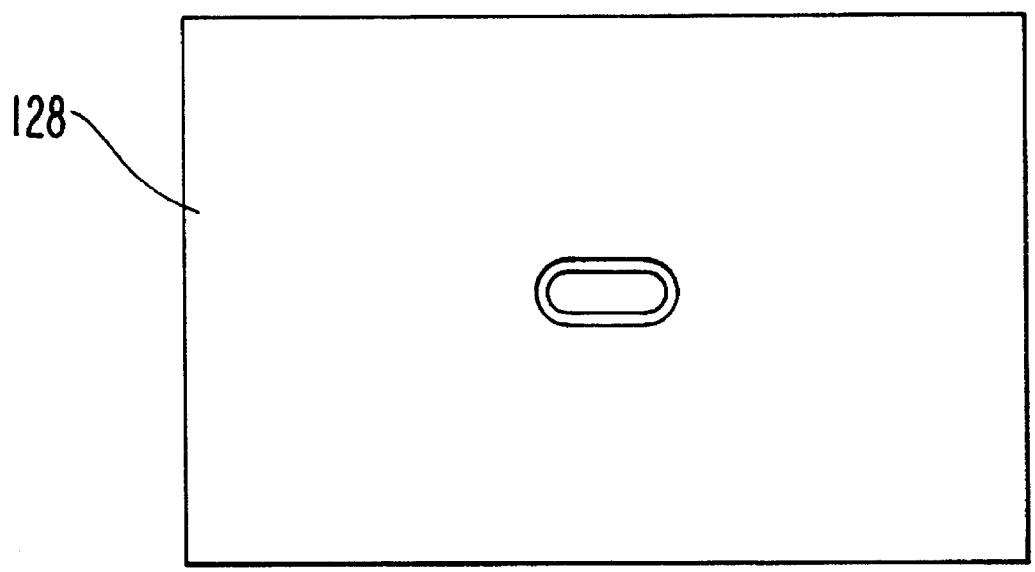
FIGS. 7 and 8 are, respectively, plan and sectional elevational views of a pad member which forms part of the locking ring and which engages the inner periphery of the steam line nozzle.
Figure 8:
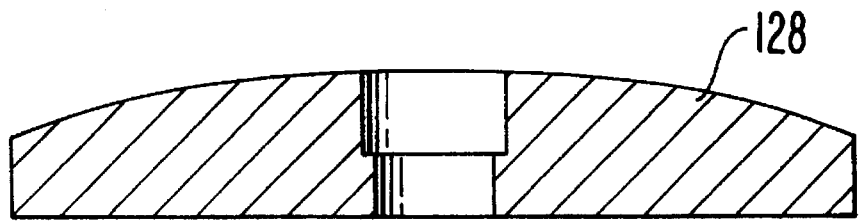

The locking ring 114 is arranged such that the pistons 126 are stepped and biased outwardly by springs 126a. Retainers 160 are threadedly disposed in the bores in which the pistons are received in a manner which limits the radially outward movement of the pistons 126. FIGS. 7 and 8 show the configuration of the pads 128 which are detachably connected to the tops of the pistons. These pads are slidably received in rectangular cross section openings formed at the outer periphery of the annular body 162 which defines the basic structure of the locking ring 114.

A tubular partition member 164 extends from the inner edge of the annular body 162 to the base plate 136. This tubular member 164 encloses the cylindrical structure 120 and partitions off the interior of the cone assembly. The accumulator 130 (see FIG. 4) is disposed in the annular cavity which is defined between the tubular member 164 and the cylindrical structure 120 in the position depicted in FIG. 4. The base plate end of the tubular member 164 is hermetically connected to the base plate 136.

Figure 3:
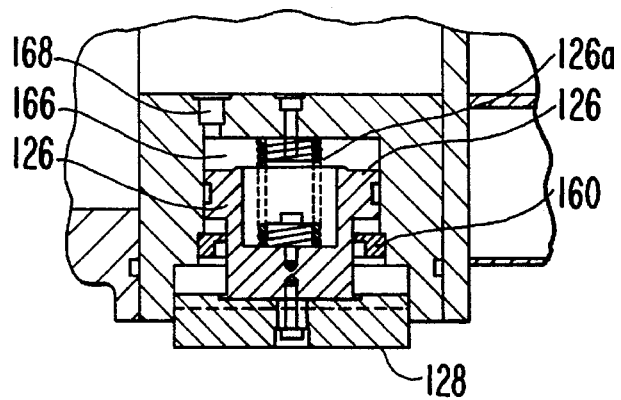
FIG. 3 is a sectional view showing details of the portion circled in broken line in FIG. 2.

The variable volume working chambers 166 which are defined by the pistons 126 are fluidly communicated with the interior of the annular body 162 by way of ports 168 (see FIG. 3).

The accumulator 130 is charged with high pressure gas ($N_2$), acts on the inboard faces of the pistons 126 and produces a force which urges the same outward.

At the same time the pressure is also transmitted via the radial bore 158 into the chamber 156 defined in the blind bore. This pressure additionally urges the stepped piston 150 in a direction which tends to additionally displace water from the upper chamber 152 and increase the pressure in the tires 112.

Accordingly, when the locking ring is activated, it is possible to additionally increase the pressure supplied to the tires 112 and thus increase the sealing effect under such conditions. This, as mentioned above, is highly advantageous when LLRT tests are to be carried out.

The pressure in the accumulator 130 is monitored in a manner which allows any leakage to be detected and the desired pressure to be maintained constant. This may be achieved by establishing a fluid communication between the accumulator and the refuel floor by way of single conduit.

Figure 9:
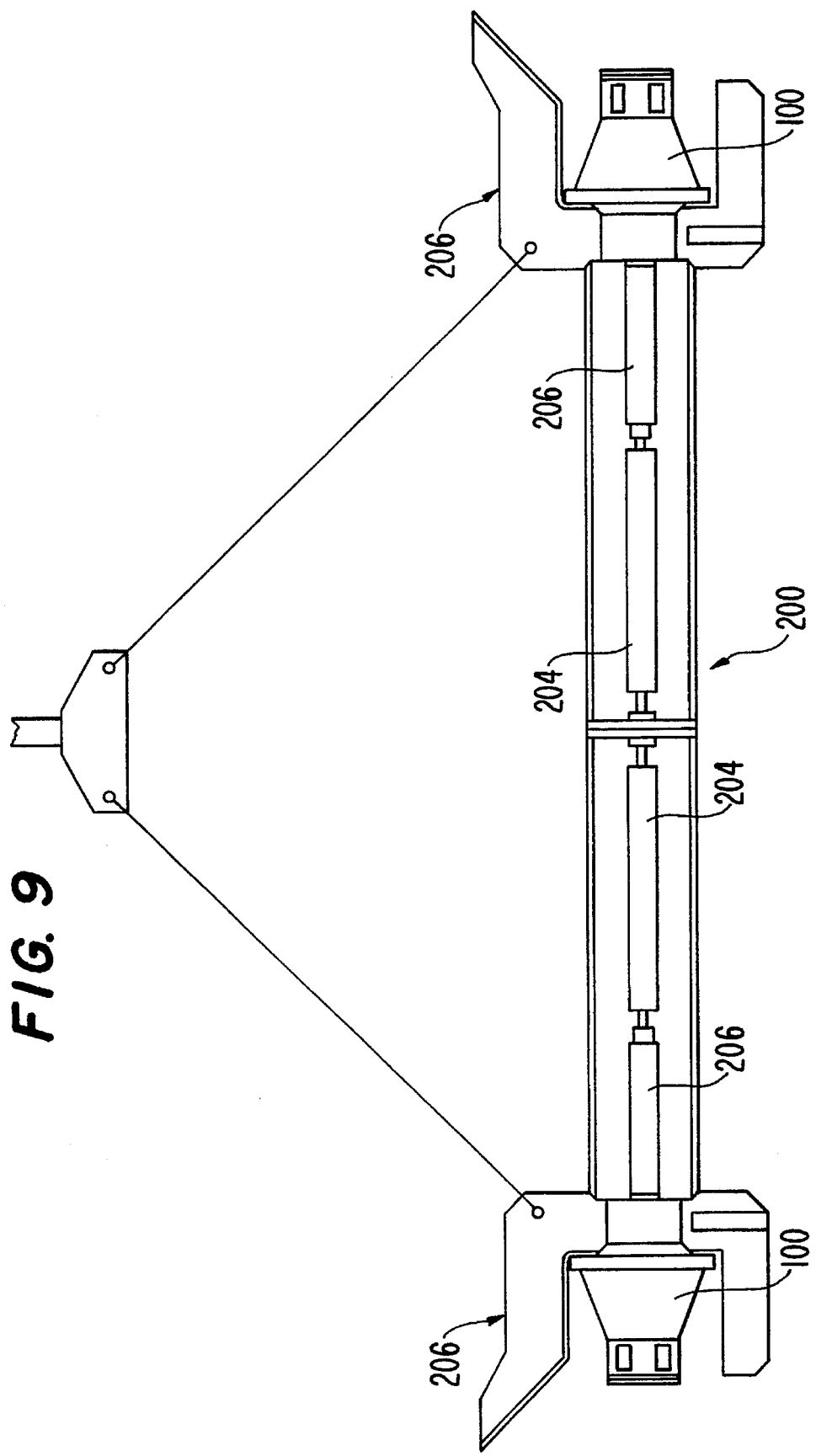
FIG. 9 is a side elevation showing a special insertion tool on which two plugs are mounted ready for insertion into opposed steam line nozzles.

A further important feature of the present invention comes in an arrangement which is used to insert two plugs at time into opposed steam line nozzles. This arrangement, or "tool" as it will be referred to, is illustrated in FIG. 9.

The tool 200 consists of a relatively elongate structural body 202 in which servo cylinders 204 and guide arms are disposed. Guide and support brackets 206 are disposed at each end of the tubular body 202. As will be appreciated from this figure, these elements are adapted to engage given structural elements of the reactor structure and facilitate aligning the plugs with the nozzles into which they are to be inserted. In the illustrated arrangement, the tool 200 is suspended by wire cable from a suitable overhead type crane or the like type of remotely controllable device.

Upon the plugs 100 being appropriately located, the cylinders 204 are activated to move the plugs into the respective nozzles. Following insertion, a non-illustrated catch mechanism releases the piston rods and allows the springs 122 (note that the preferred embodiment utilizes nested coil springs) to drive the pistons in a manner which inflates the primary seals or tires. The tool can be then be moved to pick two more plugs and the process repeated.

When it is desired to remove plugs, the tool can be swung into position and operated to grasp the ends of the piston rods. After the rods are drawn back against the bias of the springs (which results in the deflation of the tires) the plugs can be pulled back out of the nozzles and then carried back to a suitable storage area. Note that the degree by which the piston 118 can be moved against the bias of the springs 122 is limited by a stopper member 170.

It will be appreciated that the present invention is not limited to the structures disclosed above and that a number of variations are possible without departing from the scope of the present invention.

What is claimed is:

1. In a system having a conduit which terminates in a nozzle having an inner periphery, a plug for insertion into said nozzle, said plug comprising:

inflatable seal means, including inflatable seals, for establishing a fluid tight seal between the inner periphery of said nozzle and said plug;

seal inflation means for forcing a working fluid into said inflatable seals, said seal inflation means including a device which is adapted to be controlled by an insertion tool to assume a first condition wherein said inflatable seals are deflated until the plug is positioned in the nozzle, and assume a second condition wherein said inflatable seals are inflated after the plug is inserted; and hydraulically actuated locking means for establishing a friction engagement with the wall of the nozzle, wherein said device includes a spring loaded piston which has a rod which is rigid therewith and wherein said insertion tool includes means for applying a tractive force to said rod and moving said rod against a spring bias and in a direction which moves said spring loaded piston and reduces the amount of working fluid which is displaced by said piston into said inflatable seals.

2. A system as set forth in claim 1, further comprising a stepped piston which is disposed in stepped bore means in a manner to define first, second and third variable volume chambers, said first chamber being fluidly communicated with said inflatable seals via conduit means, said second chamber being fluidly communicated with a fourth chamber which varies with the displacement of said spring loaded piston, and said third chamber being exposed to the hydraulic pressure via which said locking means is actuated, the pressures prevailing in said second and third chambers producing a force which biases said stepped piston in a direction which reduces the volume of said first chamber.

3. In a system having a conduit which terminates in a nozzle having an inner periphery, a plug for insertion into said nozzle, said plug comprising:

inflatable seal means, including inflatable seals, for establishing a fluid tight seal between the inner periphery of said nozzle and said plug;

seal inflation means for forcing a working fluid into said inflatable seals, said seal inflation means including a device which is adapted to be controlled by an insertion tool to assume a first condition wherein said inflatable seals are deflated until the plug is positioned in the nozzle, and assume a second condition wherein said inflatable seals are inflated after the plug is inserted; and hydraulically actuated locking means for establishing a friction engagement with the wall of the nozzle, wherein said locking means comprises:

an annular body in which a radial bore is formed;

a piston reciprocatively disposed in the radial bore in a manner to define a working chamber; and a pad which is connected to said piston and which is adapted to engage the wall of the nozzle, and wherein said working chamber is fluidly communicated with accumulator means which is operatively connected with a source of pressure and which can be selectively pressurized from a remote site.

4. A system as claimed in claim 3, further comprising means defining a hermetically separated space within said plug which space is filled with a working fluid, the working fluid being pressurized in accordance with a pressure prevailing in said accumulator means, said working chamber being fluidly communicated with said hermetically separated space by a bore formed in said annular body.

5. In a system having a conduit which terminates in a nozzle having an inner periphery, a plug for insertion into said nozzle, said plug comprising:

inflatable seal means, including inflatable seals, for establishing a fluid tight seal between the inner periphery of said nozzle and said plug;

seal inflation means for forcing a working fluid into said inflatable seals, said seal inflation means including a device which is adapted to be controlled by an insertion tool to assume a first condition wherein said inflatable seals are deflated until the plug is positioned in the nozzle, and assume a second condition wherein said inflatable seals are inflated after the plug is inserted; and hydraulically actuated locking means for establishing a friction engagement with the wall of the nozzle, wherein said insertion tool comprises:

an elongate body;

means for supporting a plug at each end of said body;

servo means disposed within said body for moving plugs supported at each end of the body into opposed nozzles and for controlling the devices in the plugs at each end of said body to inflate the inflatable seals thereof after the plugs have been inserted into their respective nozzles.

\* \* \* \* \*